May 21, 1963 G. K. HAUSE 3,090,256
TRANSMISSION CONTROLS
Filed Aug. 30, 1961 2 Sheets-Sheet 1

INVENTOR.
Gilbert K. Hause
BY
Robert B. Gerhardt
ATTORNEY

May 21, 1963　　　　G. K. HAUSE　　　　3,090,256
TRANSMISSION CONTROLS
Filed Aug. 30, 1961　　　　　　　　　　　　2 Sheets-Sheet 2

INVENTOR.
Gilbert K. Hause
BY
Robert C. Gerhardt
ATTORNEY

United States Patent Office 3,090,256
Patented May 21, 1963

3,090,256
TRANSMISSION CONTROLS
Gilbert K. Hause, Bloomfield Hills, Mich., assignor to General Motors Corporation, Detroit, Mich., a corporation of Delaware
Filed Aug. 30, 1961, Ser. No. 135,025
6 Claims. (Cl. 74—752)

This invention relates to vehicle transmissions and more particularly to controls for fluid pressure operated drive establishing members in automatic transmissions.

In order to provide smooth and pleasant shifts from one speed to another in a multi-ratio automatic transmission, it is desirable to control the shift so that there is a proper transfer of torque from the element or elements establishing one speed to the element or elements establishing another speed. For example where friction clutches and brakes are used to establish various speed ratios of a planetary gear transmission, the application and release of these friction members must be controlled in order to either prevent so called "dog fight" or "runaway." Dog fight is a ratio overlap condition which occurs when the transmission is attempting to provide two different speed ratios simultaneously and hence when at least one friction member must slip. Runaway is a condition that occurs when during a shift between two speeds, the transmission is in neither of the two speeds and hence is in a neutral condition. This neutral condition results in considerable overspeeding of the engine when the throttle is open and the load removed from the engine. Also the friction drive elements can easily be damaged if their torque carrying capacity, as determined by the level of fluid pressure acting to engage the friction element, is insufficient to prevent slip when the drive is released from another friction element.

A hydraulic control that will provide proper shift timing for one condition of transmission operation, i.e. at a particular throttle setting, engine speed and vehicle speed, will not necessarily provide the correct timing under other drive conditions. Where overrunning devices such as roller clutches and brakes are used with planetary gears, this timing is relatively easy since overrunning devices are direction and torque sensitive and changes in torque on the various gear members will cause changes in their direction of rotation. Thus these brakes and clutches are in effect self timing. Where friction brakes and clutches are used without overrunning devices or in connection with fluid slipping devices such as controllable fluid couplings, the timing becomes more difficult.

Various methods have been proposed to vary the shift timing such as utilization of the throttle position, engine vacuum, vehicle speed etc. to control rate of flow to and/or from the fluid servos that actuate the friction members. These variables are usually not directly indicative of the actual speed and torque conditions of the individual members or gears in the gear train and also usually require considerable valving and hydraulic piping. Where the timing control is remote from the element it is controlling, there is usually a time lag between the response of the control and the resulting effect on the member being controlled. This leads to varying inaccuracies.

It is therefore an object of this invention to provide control means for an automatic transmission that will regulate the transfer of torque from one drive establishing element of a transmission to another drive establishing element.

Another object is to provide a transmission control that includes means for sensing the speed of one element of the transmission and the condition of one fluid applied servo member in order to control the release of another friction member.

Still another object is to provide a timing control for a transmission drive establishing element that is directly adjacent to the element and hence instantly responsive.

These and other objects and advantages will be readily apparent to those skilled in the art from the following description and accompanying drawings in which.

Figure 1:
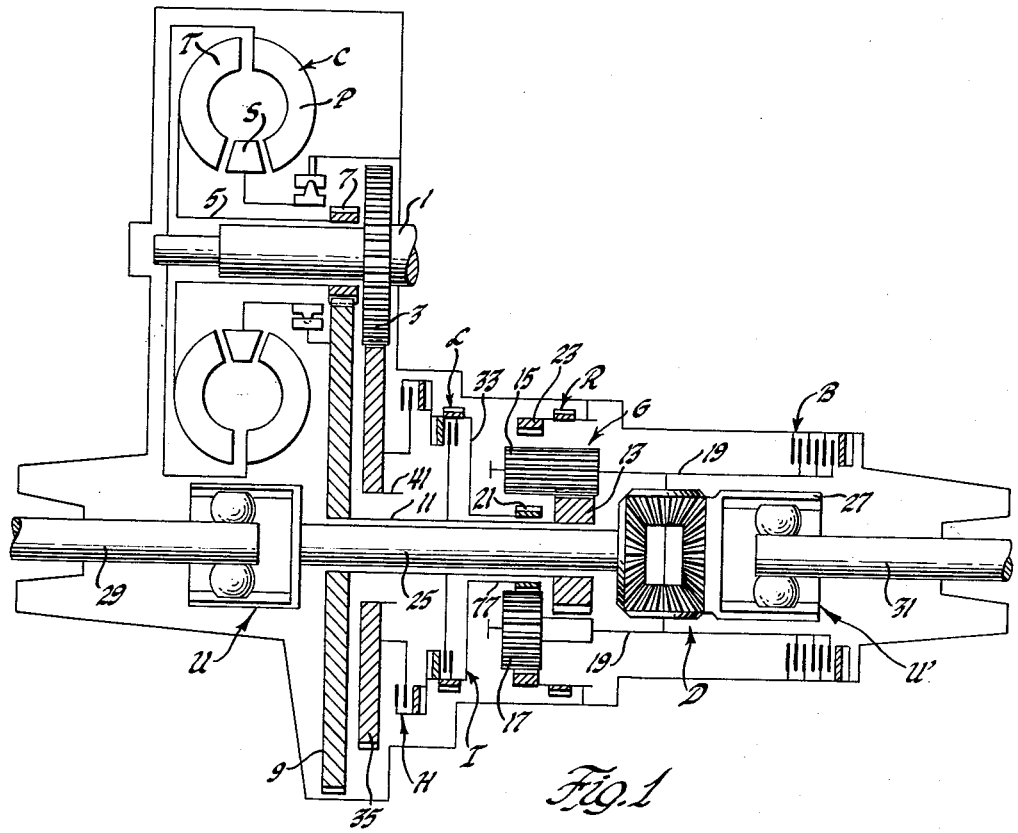
FIG. 1 is a diagrammatic view of one form of transmission that might employ the invention.

The transmission shown in FIGURE 1 is merely illustrative of one type of transmission that might employ the subject invention. This transmission is the same as that shown and described in my co-pending application S.N. 855,840, filed November 27, 1959 and now Patent No. 3,029,662 and assigned to the assignee of the present invention. Since the transmission is described and the operation set forth in S.N. 855,840, only the essential portions and operation necessary to understand the present invention are described herein.

The transmission illustrated is of the type for use as a combined transmission and rear axle and includes an input shaft 1 adapted to be connected to an engine, not shown, which is connected to drive the impeller or pump member P of a hydraulic torque converter generally designated C and which includes a turbine T and a stator or reaction member S mounted for rotation only in a forward direction. The input shaft 1 is also connected to rotate a gear 3. The turbine T drives a sleeve shaft 5 on which is a gear 7 of smaller diameter than the gear 3. The gear 7 meshes with a large diameter gear 9 that is connected through a sleeve shaft 11 to a sun gear 13 of a double pinion compound planetary gear set generally designated G. The gear set G also includes one or more pairs of planet pinions 15 and 17 that mesh with each other and are rotatably mounted on a common carrier member 19. The sun gear 13 meshes with the longer pinion gear 15, as shown in FIGURE 1, and a second, smaller diameter sun gear 21 meshes with the shorter, but larger diameter pinion 17. A ring gear 23 also meshes with the short pinion gear 17.

The carrier member 19, which forms the output member of the gear set G is connected through a differential gear set, generally designated D, which differentially transmits torque from the gear carrier 19 to a shaft 25 and a sleeve member 27. These members 25 and 27 are connected through universal joints generally designated U and U' to a pair of oppositely extending axle shafts 29 and 31 which are connected to vehicle drive wheels, not shown.

As mentioned above the sun gear 13 is connected through shaft 11 to the gear 9. The sun gear 21 is connected to an intermediate member 33 which can be held against rotation by a friction band member L that establishes low speed. The intermediate member 33 can also be connected by a multiple disc friction clutch, generally designated I, to the shaft 11. This clutch I hereinafter sometimes is referred to as the intermediate or 2nd speed clutch. Another clutch, generally designated H, to a gear 35 that meshes with the gear 3 on the input shaft 1. The clutch H will hereinafter sometimes be referred to as the high or 3rd speed clutch.

As set forth in S.N. 855,840 referred to above, low or first speed forward drive is established by applying the band L to hold the sun gear 21 against rotation and thereby provide torque reaction in the planetary gear set G.

Clutches I and H are released for this low drive condition. The drive is then from the transmission input shaft 1 through the torque converter C, then through gears 7 and 9 to the shaft 11 and sun gear 13. With the sun gear 21 held against rotation, the carrier 19 is caused to rotate forwardly at a reduced speed relative to sun gear 13. Since the gears 7—9 in series with the gear set G also act to provide a reduction ratio, the overall ratio through the transmission is a combination of the torque converter ratio plus the ratio of gears 7—9 and the ratio of the gear set G.

To establish intermediate or 2nd speed, the band L is released and the clutch I is applied. This causes the intermediate member 33 and sun gear 21 to be driven at the same speed as sun gear 13 and the gear set G is essentially locked up in direct drive. The overall ratio of the transmission is then that of the torque converter plus the ratio of gears 7—9. Third or high speed is established by releasing clutch I and engaging clutch H which acts to connect the intermediate member 33 and sun gear to the gear 35 driven by the input gear 30. Since the gears 3—35 provide a smaller reduction than the gears 7—9, then the sun gear 21 will be driven forward at a speed faster than the gear 13 and the output carrier 19 will rotate forwardly at a speed faster than the sun gear 13. In this drive condition some of the torque passes through the torque converter C and some directly through the gears 3—35.

Reverse speed is obtained by applying a band R to hold the ring gear 23 with the clutches I and H being released. The drive is then from the torque converter C to the sun gear 13. The ring gear 23 provides the reverse reaction for reverse reduced speed drive of the carrier 19.

A multiple disc brake, generally designated B, can be applied to hold the carrier 19 and through the differential D brake the rotation of the axles 29 and 31 and their connected wheels.

Figure 2:
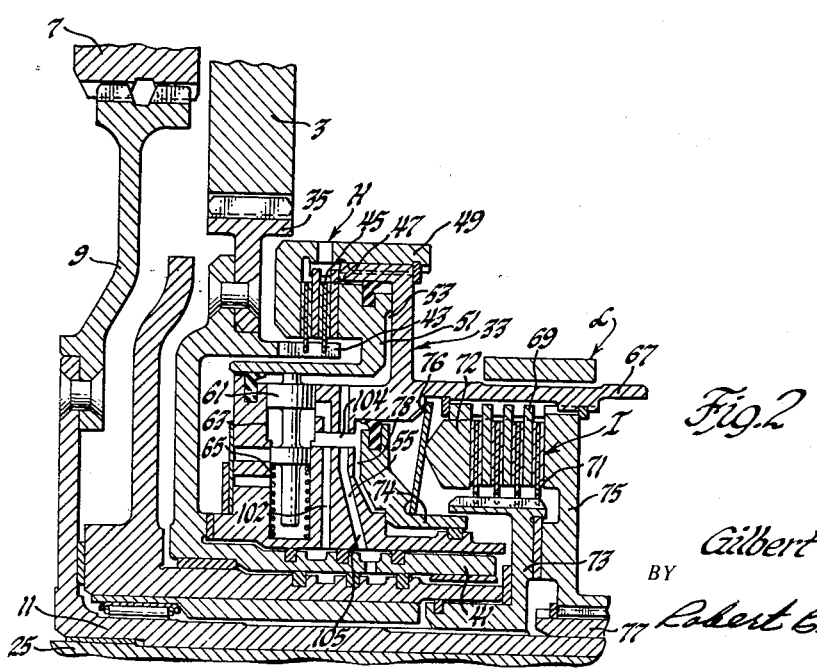
FIG. 2 is a cross section detailed view of a portion of the transmission of FIGURE 1 and showing a timing valve incorporated therein.

Referring now to FIG. 2, which shows a detailed construction of a portion of the transmission in FIGURE 1, the lower ends of the drive gears 7 and 3 shown in FIGURE 1 can be seen. The gear 7 meshes with the large diameter gear 9 which is connected to the sleeve shaft 11 that surrounds the left hand differential output shaft 25. The input gear 3 meshes with the gear 35 which is connected to a radial flange portion of a support sleeve member 41. This flange also has an annular axial extension 43 on which are splined the drive plates 45 of the high or 3rd speed friction clutch H which also includes driven plates 47 splined to a drum portion 49 formed as part of the intermediate member 33. A hydraulic piston 51 is axially slidable in a cylinder formed in the intermediate member 33. When fluid pressure is introduced in chamber 53 it acts against the piston 51 to urge the driving and driven plates 45 and 47 together to establish a drive between the gear 35 and the intermediate member 33.

Fluid pressure flows into and out of chamber 53 through a radial passage 55 formed in the member 33. Pressure in chamber 53 also acts on the top of a valve member 61 slidably mounted in a radial bore 63 formed in the intermediate member 33. The valve member 61 will hereinafter sometimes be referred to as the timing valve. A spring 65 urges the timing valve 61 radially outwardly against the pressure in chamber 53. The piston 51 limits outward movement of the valve 61.

The intermediate member 33 has an axially extending annular portion 67 that has clutch plates 69 of the high speed clutch H splined therein. These plates 69 cooperate with driven plates 71 splined on a flanged member 73 which is splined on the sleeve shaft 11. The intermediate member 33 is also drivingly connected through the pressure plate 75 to a shaft 77 connected to the sun gear 21. The clutch plates 69 and 71 are engaged by an annular pressure apply member 72 which is urged to an engagement position by a piston 74 acting through a lever spring 76. The piston 74 is actuated by hydraulic pressure in chamber 78 formed in the intermediate member 33.

Figure 3:
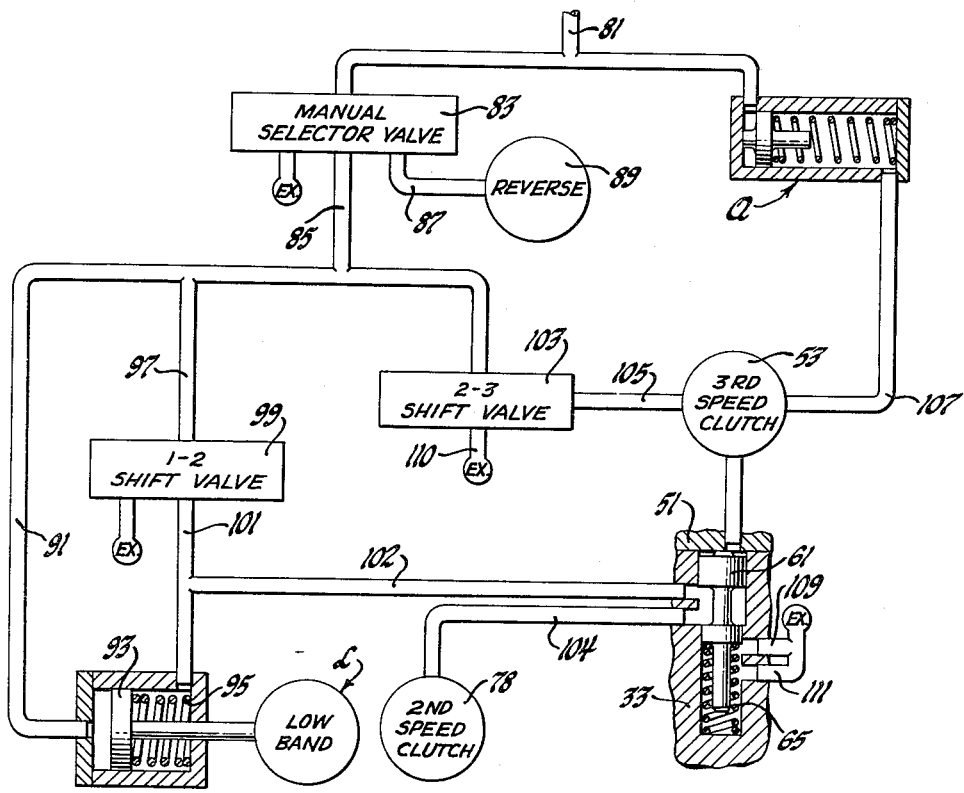
FIG. 3 is a schematic flow diagram of a portion of a hydraulic control system for the transmission of FIGURE 1 including the timing valve shown in FIG. 2.

Simplified hydraulic controls for the clutches I and H, as well as the low band L and reverse band R, are schematically shown in FIGURE 3. A source of pressure such as a regulated pressure from a pump, not shown, supplies fluid under pressure to passage 81. A manual selector valve 83 directs this pressure either to a forward pressure passage 85 or a reverse pressure passage 87. The reverse passage 87 leads to the reverse servo 89 which actuates the reverse band R of FIGURE 1. Pressure in the forward drive passage 85 acts through a branch 91 on a low servo piston 93 to move it against a spring 95 and apply the low band L of FIGURE 1 and 2.

A branch 97 of the forward pressure passage 85 supplies fluid under pressure to a 1–2 shift valve 99 which controls the shift between low or 1st speed and intermediate or 2nd speed. The controls for the shift valve 99 are not shown as they may be of any conventional form and the details thereof form no part of the invention. Generally such shift valves are controlled by opposing pressures acting on the valve to automatically move the same between various positions to obtain a ratio change at the proper time. These pressures may be vehicle speed responsive, throttle position responsive, or engine speed responsive. In the case of the valve 99 of FIGURE 3, the valve would be automatically moved to supply fluid from forward pressure passage 97 to a 2nd speed pressure passage 101. Pressure therein acts on the end of the low servo piston 93 to aid the spring 95 in releasing the low band L. At the same time pressure in 2nd speed passage 101 is connected by the timing valve 61 in intermediate member 33 to the second speed clutch apply chamber 78. As explained above, the valve 61 is normally held in the position shown in FIGURES 2 and 3 by the spring 65. When the intermediate member 33 is rotating the spring force on the valve is augmented by centrifugal force thereon.

Shifting of the transmission to third or high speed is controlled by a 2–3 shift valve 103 which, like the 1–2 shift valve 99, is automatically controlled by any suitable means to cause a shift from intermediate or 2nd speed to high or 3rd speed. When the 2–3 valve shifts to its upshifted or 3rd speed position it connects the forward drive passage 85 to the 3rd speed clutch apply passage 105. This pressure is then transmitted to the 3rd speed apply chamber 53. An accumulator passage 107 is connected to an accumulator, generally designated $a$ which controls the rate of build up in the clutch apply chamber 53 in a known manner and hence provides for a smooth application of the high or 3rd speed clutch.

Figure 4:
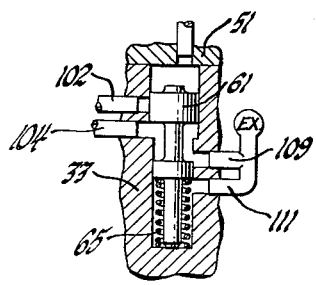
FIG. 4 is a sectional view of the timing valve of FIGURE 3 shown in another position.

As shown in FIGURES 2 and 3, pressure in chamber 53 also acts on the top of the timing valve 61 to urge it against spring 65. The valve body for valve member 61 is formed in the intermediate member 33 and includes exhaust ports 109 and 111. When the 3rd speed clutch apply pressure in chamber 53 acting on the top of valve 61 increases to a value sufficient to overcome both the force of spring 65 and any centrifugal force acting on the valve, the valve will move radially inward to the position shown in FIGURE 4. In this position the valve 61 cuts off the pressure in passage 102 from the 1–2 shift valve 99 and connects the 2nd speed clutch apply passage 104 to the exhaust port to allow disengagement of the clutch I.

It will be seen from the above that the exhaust of chamber 78, and hence disengagement of the intermediate or 2nd speed clutch I, is dependent on the speed of rotation of the intermediate member 33 and also dependent on the pressure in chamber 53 that is applying the high or 3rd speed clutch H.

During a relatively low speed upshift from 2nd to 3rd speeds such as will occur during a light or closed throttle low speed and low torque upshift, the centrifugal force on the valve 61 will be relatively low and the 2nd speed clutch will be disengaged when the pressure on clutch H has increased to a relatively low value. In this case there will be little or no time overlap of the engagement of the 2nd and 3rd speed clutches. On the other hand if the speed of the intermediate member 33 is relatively high, as when a full throttle upshift from 2nd to 3rd is being made, then the 2nd speed clutch I will not be released until the pressure on clutch H has reached a relatively high value. This action will insure that there is no engine runaway neutral condition nor any slippage of the 3rd speed clutch during the shift. In other words the pressure on the 3rd speed clutch will be at a high level ensuring a high torque carrying capacity of the same when the 2nd speed clutch disengages and the 3rd speed clutch takes over the drive load.

It will be seen from the above that the operation of valve 61 provides for smooth and pleasant shifts during the 2nd to 3rd speed change. The high clutch H will always be engaged with sufficient force to carry the torque transmitted through it when the 2nd speed clutch is disengaged and yet no neutral or runaway condition will occur since the 2nd speed clutch will retain the drive until the 3rd speed clutch is ready. In low drive the intermediate member 33 is held stationary by the low band L, however, since the timing valve 61 is not utilized in low speed this does not affect the operation of the transmission.

When a downshift from 3rd speed to 2nd speed is initiated by the 2-3 shift valve control, the pressure to the 3rd speed clutch chamber 53 is relieved through an exhaust port 110. The accumulator a will tend to hold the pressure on the clutch until it has stroked its full length. When the pressure in the chamber 53 drops to a value insufficient to hold the valve 61 on the position shown in FIGURE 4, the valve is moved back to the position of FIGURE 3 and connects the 2nd speed clutch pressure chamber 28 to the supply passage 102. As in the case of the shift from 2nd to 3rd, the valve 61 will effect a proper timing of the transfer of drive torque between the 3rd speed clutch H and the 2nd speed clutch I. If the downshift from 3rd to 2nd is made at open throttle conditions or under forced downshift conditions the speed of the intermediate member 33 will be high and the valve 61 will move between its FIGURE 4 and FIGURE 3 positions with a relatively high pressure still remaining on the 3rd speed clutch. This will ensure that there is no engine runaway or racing caused by momentary neutral condition in the transmission. On the other hand if the downshift is made under light throttle and low speed conditions, the 2nd speed clutch will not be engaged until the 3rd speed clutch pressure has dropped to a relatively low value. This will allow the engine time to make the speed change necessary to accommodate the different gear ratio without dogfight or harshness.

It will be understood that the invention may be applied to other forms of transmissions than that shown. The timing valve 61 may be utilized wherever a variable timing of the transfer of torque from one friction type ratio establishing member to another friction type ratio establishing member is desired. Furthermore the valve may be located at any number of locations and the transmission hydraulic control may be of any form. Many changes, modifications and applications will be apparent to those skilled in the art and such changes and applications are deemed to be within the scope of the invention which is limited only by the following claims.

I claim:

1. In a multiple speed ratio transmission having gearing and having a first fluid actuated friction means for establishing one speed ratio in the transmission and a second fluid actuated friction means for establishing a different speed ratio in the transmission, a hydraulic control system for said fluid actuated means including a source of fluid under pressure, ratio selection valve means for at times directing fluid under pressure to said first means to establish said one speed ratio and for at times directing fluid under pressure to said second means to establish said different speed ratio, and timing valve means between said valve means and said first means for alternatively connecting said first means to said ratio selection valve means for engaging said first means or to exhaust for disengaging said first means, said timing valve means responsive to both the speed of rotation of an element of the transmission and to the pressure acting on said second means and effective to delay the disengagement of said first drive establishing friction means until the fluid pressure acting on said second drive establishing means reaches a predetermined value dependent on the speed of said transmission element.

2. In a multiple speed ratio transmission having gearing and having a first fluid actuated friction means for establishing one speed ratio in the transmission and a second fluid actuated friction means for establishing a second speed ratio in the transmission, a hydraulic control system for said fluid actuated means including a source of fluid under pressure, valve means for at times directing fluid under pressure to the first of the means and for at times directing fluid under pressure to the second of the means, and timing valve means between said valve means and said first means for controlling the release of pressure on said first means, said timing valve means responsive to both the speed of rotation of an element of the transmission and to the fluid pressure acting on said second means and effective to delay the release of said first drive establishing friction means until the fluid pressure acting on said second drive establishing means reaches a predetermined value dependent on the speed of said transmission element.

3. In a multiple speed transmission having gearing and including a first drive transmitting member and a pair of fluid operated friction devices for coupling said drive transmitting member alternatively to a second drive transmitting member or to a third drive transmitting member, hydraulic control means for selectively directing fluid under pressure to said fluid operated friction devices, and timing means carried by said first drive transmitting member and centrifugally responsive to the speed thereof for delaying the disengagement of one of said friction members until the other of said friction members has been engaged with a predetermined force dependent on the speed of said first drive transmitting member.

4. In a multiple speed transmission having gearing and including a first drive transmitting member and a pair of fluid operated friction devices for coupling said first drive transmitting member alternatively to a second drive transmitting member or to a third drive transmitting member, a source of fluid pressure, hydraulic control means for selectively directing fluid under pressure to said fluid operated friction devices for actuation thereof, and timing means carried by said first drive transmitting member and centrifugally responsive to the speed thereof for delaying the engagement and disengagement of said first of said friction devices until the pressure on the second of said friction devices reaches a predetermined value dependent on the speed of said first drive transmitting member.

5. In a multiple speed ratio transmission having gearing and having a first fluid actuated friction means for establishing one speed ratio in the transmission and a second fluid actuated friction means for establishing a second speed ratio in the transmission, a hydraulic control system for said fluid actuated means including a source of fluid under pressure, automatic shift valve means for at times directing fluid under pressure to the first of the means and for at times directing fluid under pressure to the second of the means, means for causing the pressure on said second friction means to build up at a predetermined rate, and timing valve means between said valve means and said first means for controlling the release of said first means, said timing valve means responsive to the pressure acting on said second means to move the same to a position releasing said first means, said timing valve means also responsive to centrifugal force that varies with the speed of one of the elements of the transmission, said centrifugal force opposing movement of said timing valve to said releasing position until the pressure on said second means has increased to a value sufficient to overcome said centrifugal force and thereby delaying the release of said first drive establishing friction means until the fluid pressure acting on said second drive establishing means reaches a predetermined value dependent on the speed of said transmission element.

6. In a multiple speed ratio transmission having gearing and having an input element, an output element and a plurality of intermediate elements, a first fluid actuated friction means for establishing one speed ratio in the transmission between said input and output elements and a second fluid actuated friction means for establishing a second speed ratio in the transmission between said input and output elements, a hydraulic control system for said fluid actuated means including a source of fluid under pressure, automatic shift valve means for at times directing fluid under pressure to the first of the means and for at times directing fluid under pressure to the second of the means, accumulator means for causing the pressure on said second friction means to build up at a predetermined rate, and timing valve means between said valve means and said first means for controlling the release and application of said first means, said timing valve means responsive to the pressure acting on said second means to move the same to a position releasing said first means, said timing valve means also responsive to a centrifugal force that varies with the speed of one of the intermediate elements of the transmission, said centrifugal force opposing movement of said timing valve to said releasing position until the pressure on said second means has increased to a value sufficient to overcome said centrifugal force and thereby delaying the release of said first drive establishing friction means until the fluid pressure acting on said second drive establishing means reaches a predetermined value dependent on the speed of said transmission element.

References Cited in the file of this patent
UNITED STATES PATENTS

| | | |
|---|---|---|
| 2,899,834 | Polomski | Aug. 18, 1959 |
| 2,929,478 | Tuck et al. | Mar. 22, 1960 |
| 2,946,241 | Snyder | July 26, 1960 |